United States Patent
Pechtl et al.

(10) Patent No.: US 7,356,383 B2
(45) Date of Patent: Apr. 8, 2008

(54) METHODS AND APPARATUS FOR OPTIMIZING COMBINED CYCLE/COMBINED PROCESS FACILITIES

(75) Inventors: Peter Anton Pechtl, Graz (AT); Martin Posch, Graz (AT); Bijan Davari, Fremont, CA (US); Marco Robert Dieleman, Moutain View, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/055,312

(22) Filed: Feb. 10, 2005

(65) Prior Publication Data

US 2006/0178782 A1 Aug. 10, 2006

(51) Int. Cl.
G05D 19/00 (2006.01)
(52) U.S. Cl. .......................... 700/288; 700/287; 703/18
(58) Field of Classification Search ........ 700/286–288; 703/18
See application file for complete search history.

(56) References Cited

U.S. PATENT DOCUMENTS

| | | | |
|---|---|---|---|
| 4,258,424 A * | 3/1981 | Giras et al. ................. | 700/290 |
| 4,455,614 A | 6/1984 | Martz et al. | |
| 5,331,579 A | 7/1994 | Maguire, Jr. et al. | |
| 5,347,466 A * | 9/1994 | Nichols et al. ................ | 703/18 |
| 5,925,223 A | 7/1999 | Simpson et al. | |
| 6,178,735 B1 | 1/2001 | Frutschi | |
| 6,338,009 B1 | 1/2002 | Sato et al. | |
| 6,591,225 B1 | 7/2003 | Adelman et al. | |
| 6,681,155 B1 * | 1/2004 | Fujita et al. ................. | 700/287 |
| 7,058,552 B2 | 6/2006 | Stothert et al. | |
| 7,096,156 B2 | 8/2006 | Hosaka et al. | |
| 2003/0100974 A1 | 5/2003 | Alvarez et al. | |
| 2004/0102872 A1 | 5/2004 | Schick et al. | |
| 2005/0102126 A1 | 5/2005 | Tanaka et al. | |

FOREIGN PATENT DOCUMENTS

DE 103 47 078 A1 4/2004

OTHER PUBLICATIONS

European Search Report, Application No. 06250688.6 (Aug. 7, 2006).

* cited by examiner

Primary Examiner—Ryan A. Jarrett
(74) Attorney, Agent, or Firm—Armstrong Teasdale LLP

(57) ABSTRACT

Methods and systems for operating combined cycle electrical generating plants is provided. The method includes simulating the electrical power plant performance, simulating the steam utilizing process plant performance, parameterizing plant equipment and plant performance using the power plant and process plant simulation results, and solving parameterized simultaneous equations and constraints with an objective function to determine parameter settings that facilitate enhancing an efficiency of the combined cycle electrical generating/steam-utilizing process plant.

29 Claims, 4 Drawing Sheets

METHODS AND APPARATUS FOR OPTIMIZING COMBINED CYCLE/COMBINED PROCESS FACILITIES

BACKGROUND OF THE INVENTION

The present invention relates generally to the control of production facilities, and more particularly to a system used to facilitate optimizing the output of a system of production facilities.

At least some known power generating plants combine at least some of their systems with at least one process plants, such as, but, not limited to a chemical plant, a district heating facility, and/or a paper mill. Combining the power generation plant and the process plant may facilitate increasing the efficiency of one of, or both of, the power generation process and the process plant, by utilizing energy that would otherwise be rejected to the atmosphere or to a heat sink in either the power generating process or the process plant. Known combined power and process plants may include various combinations of gas turbines, fired and non-fired heat recovery boilers, steam turbines, fossil fuel fired boilers, solar boilers, cooling towers, condensers, and/or feed water heaters.

In operation, combined power and process plant demands may vary based on customer demand levels, and on other unpredictable events, such as, but, not limited to, weather conditions. Additionally a ratio between power demand and process production may vary based on seasonal operations. Accordingly, known combination plants may be designed for use with a wide range of operating states to meet the required dispatch of power and process outputs.

However, designing combination plants may be difficult, as each plant may have operating characteristics that are different than every other plant in the combined cycle/ combined process plant system, such that an operating efficiency of each plant, defined in terms of the utilization of resources per unit of output, may be different than the operating efficiency of every other plant. For example, within a combined electric generating plant and water desalination process plant, although several resources may be used to generate electricity and/or to desalinate water, improving the efficiency of each plant's use of resources may not necessarily cause the largest impact to the economical generation of electricity and production of water. More specifically, each plant in the combined facility may be operated individually to facilitate maximizing the plant efficiency, or to generate the production output using the least amount of resources. However, maximizing the efficiency of each individual plant may not facilitate maximizing the efficiency of the combined system.

Accordingly, to facilitate maximizing the efficiency of the production system, at least some known power production systems attempt to choose plant settings, such as, but, not limited to, a number of gas turbines in operation, a load level of gas and steam turbines, a duct firing, a number of desalination plants in operation, a top brine temperature, a re-circulation ratio, and a frequency and duration of blow downs to facilitate attaining the highest production system efficiency possible. However, because the conditions that influence each plant's efficiency and the efficiency of the combined production facility constantly change, it may be difficult to monitor and properly adjust plant parameters to achieve an optimum efficiency for the combined production facility.

BRIEF DESCRIPTION OF THE INVENTION

In one aspect, a method of operating a combined cycle electrical generating plant is provided. The system includes at least one electrical generating power plant coupled in heat transfer communication to a steam-utilizing process plant. The method includes simulating the power plant performance, simulating the process plant performance, parameterizing plant equipment and plant performance using the power plant and process plant simulation results, and solving parameterized simultaneous equations and constraints with an objective function to determine parameter settings that facilitate enhancing an efficiency of the combined cycle electrical generating/steam-utilizing process plant.

In another aspect, a computer readable medium encoded with a program is provided. The program is configured to instruct a computer to simulate a power plant performance, simulate a process plant performance, parameterize overall plant equipment and overall plant performance using the power plant and process plant simulation results, and solve parameterized simultaneous equations and constraints with an objective function to determine parameter settings that facilitate enhancing an efficiency of the combined cycle electrical generating/steam-utilizing process plant.

In yet another aspect, a combined cycle/combined process plant optimizing system is provided. The system includes a first process plant that generates a quantity of waste heat, a second process plant that utilizes heat as an input to at least one plant process wherein the second plant is in heat-transfer communication with the first process plant, and a computer operationally coupled to at least one of the first process plant and the second process plant wherein the computer is configured to monitor process parameters of the first process plant and the second process plant, simulate the first process plant performance, simulate the second process plant performance, parameterize a plurality of overall plant equipment and overall plant performance using the first and second power plant and process plant simulation results, and solve parameterized simultaneous equations and constraints with an objective function to determine parameter settings that facilitate enhancing an efficiency of the combined cycle electrical generating/steam-utilizing process plant.

DETAILED DESCRIPTION OF THE INVENTION

Figure 1:
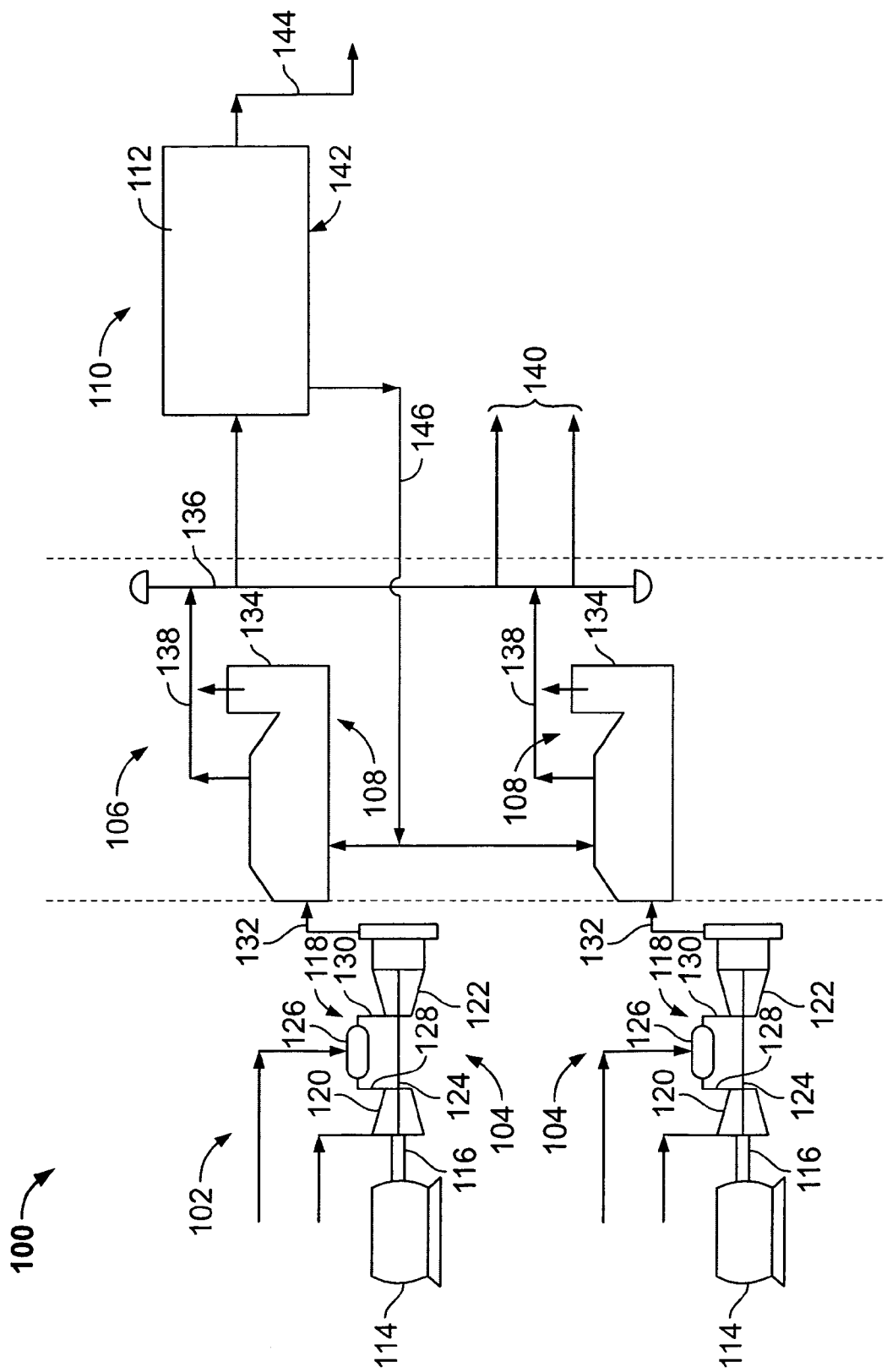
FIG. 1 is a schematic illustration of an exemplary combined cycle/combined process plant.

FIG. 1 is a schematic illustration of an exemplary combined cycle/combined process plant 100. In the exemplary embodiment, plant 100 includes an electrical generation portion 102 that includes a pair of gas turbine power plants 104, a heat recovery portion 106 that includes a pair of heat recovery steam generators (HRSG) 108, and a process plant portion 110 that includes a desalination plant 112. Generation portion 102 may be configured using a combination of thermal power electrical generating plants that may include, but is not limited to, gas turbine engines, fossil-fired boilers, biomass-fired boilers, waste recovery boilers, waste incinerating furnaces, nuclear boilers, geothermal sources, and solar sources. Heat recovery portion 106 may be configured with non-fired and fired heat recovery steam generators, as well as other known heat recovery devices. Process plant portion 110 may include various types of plants that use heat as an input to the process, including, but not limited to, refineries, paper mills, manufacturing facilities, heating districts, fish farms, baking plants, steam absorption chillers, and agricultural product processing plants.

In the exemplary embodiment, gas turbine engines 104 each include an electrical generator coupled through a shaft 116 to a gas turbine engine 118. Each gas turbine engine 118 includes a compressor 120 coupled to a turbine 122 through a shaft 124. A combustor 126 is coupled between compressor 120 and turbine 122, such that a compressor outlet 128 is coupled in flow communication with a turbine inlet 130 through combustor 126. Depleted exhaust gases exit turbine 122 through a turbine exhaust outlet 132. As exhaust gases are channeled through passages in HRSG 108, heat energy in the gases converts water flowing through HRSG 108 into steam. The exhaust gases are then discharged from HRSG 108 through a stack 134, and released to the atmosphere or to a pollution control device (not shown). Steam produced in HRSG 108 is routed to a steam header 136 through a steam line 138 wherein the steam is available for distribution to a variety of steam loads 140 and desalination plant 112. Desalination plant 112 includes a seawater inlet 142 used to supply raw salt water to desalination plant 112, a distilled water outlet 144 for removing processed freshwater from plant 112, and a condensate return 146 to return condensed steam back to HRSG 108 to complete a steam/condensate HRSG cycle.

Each plant portion 102, 106, and 110 also includes various ancillary equipment that is not shown, such as, but, not limited to monitoring instruments, pumps, motors, draft fans, tanks, valves, cooling towers, condensers, feed water heaters, and chemical treatment systems.

In operation, air flows through compressor 120 and compressed air is delivered to combustor 126. Exhaust gas flow from combustor 126 drives turbine 122, and turbine 122 drives electrical generator 114. The exhaust gases exit turbine 122 and enter HRSG 108, such that heat contained in the exhaust gases is transferred to water flowing through HRSG 108. Steam exits HRSG 108 and is routed to steam header 136 for distribution to various loads coupled to header 136. Desalination plant 112 receives steam to boil raw water in a distillation process, or to heat water in a flash process. Water in a gaseous state is collected regeneratively and supplied to a freshwater storage system (not shown). Raw water feed is pre-heated and supplied to plant 112. Steam condensate is collected and returned to HSRG 108 where it is again heated to steam in a continuous cycle.

The ratio between power generation and water production varies based on several factors, such as but not limited to, a seasonal demand. The power plant and desalination plant are designed for a wide range of operating states, and the required dispatch of power and water can be achieved with many different states. Each state may be associated with an overall heat rate and an overall economic performance. Operating at an optimal overall heat rate, in many cases may not yield optimal overall economic performance. System operators may vary a plurality of plant settings, such as, but not limited to, the number of gas turbines in operation, the load level of gas and steam turbines, duct firing, the number of desalination plants in operation, top brine temperature, re-circulation ratios, and blow downs to achieve an optimal economic operation for any given dispatch of power and water.

Figure 2:
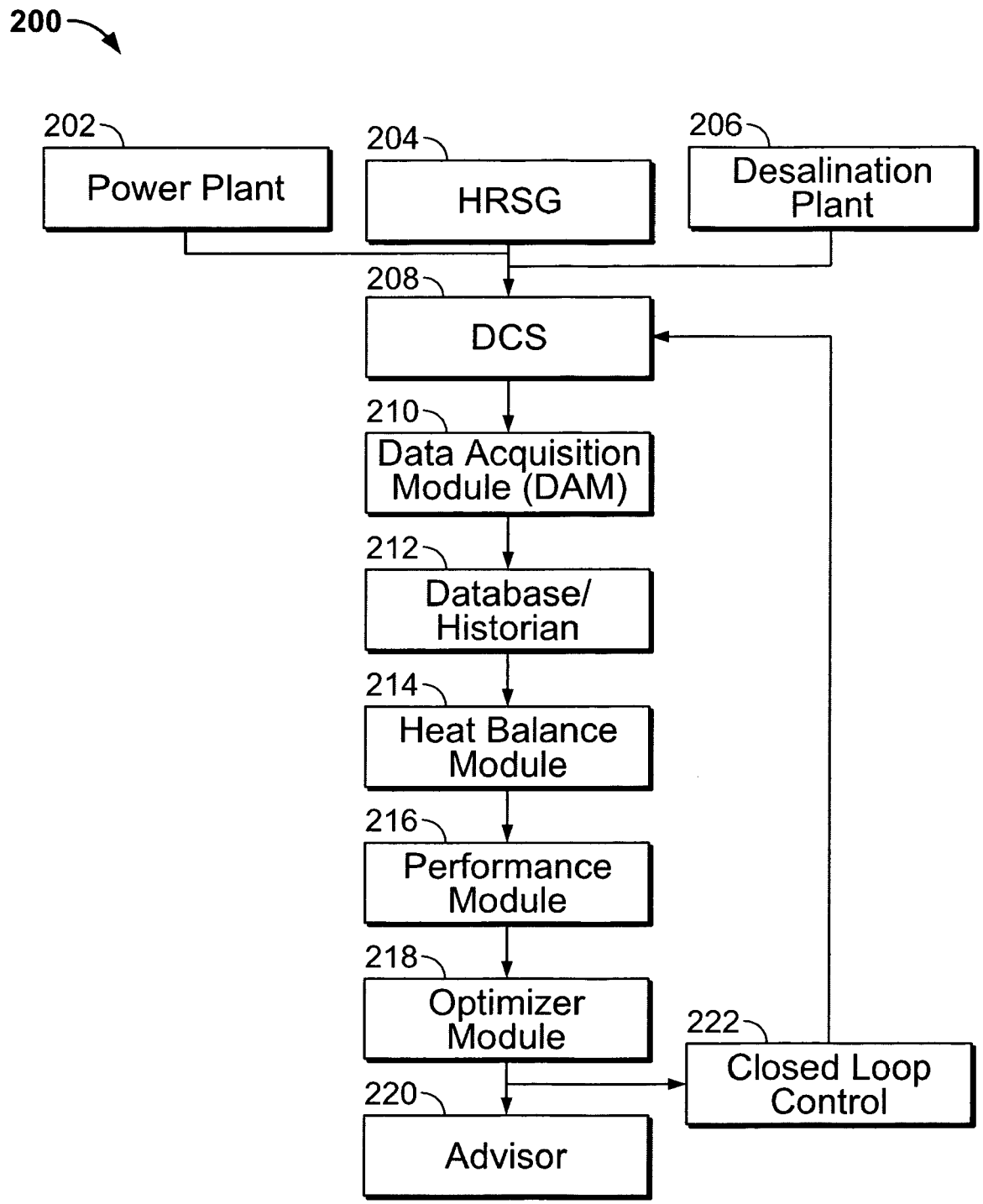
FIG. 2 is a data flow diagram of an exemplary embodiment of an architecture for a thermal power and process plant optimization system that may be used to optimize the output of the thermal power and process plant shown in FIG. 1.

FIG. 2 is a data flow diagram of an exemplary embodiment of an architecture for a thermal power and process plant optimization system 200 that may be used to optimize the output of thermal power and process plant 100 (shown in FIG. 1). In the exemplary embodiment, system 200 includes monitoring and control instruments 202 coupled to various components of electrical generation portion 102. Such instruments may include, but are not limited to, pressure and temperature sensors, flow and speed sensors, and combustion gas sensors. System 200 also includes monitoring and control instruments 204 associated with heat recovery portion 106 and monitoring and control instruments 206 associated with process plant 110. Each of monitoring and control instruments 202, 204, and 206 transmit signals indicative of measured process parameters to distributed control system (DCS) 208. DCS 208 receives the signals, processes the signals in accordance with predetermined algorithms and transmits control signals to monitoring and control instruments 202, 204, and 206 respectively to affect changes to plant operations. DCS 208 interfaces with a software data acquisition module (DAM) 210. In the exemplary embodiment, DAM 210 is a software code segment that executes on a standalone PC-based computer system communicatively coupled to DCS 208.

DAM 210 is communicatively coupled to a database/historian 212 that maintains archival data for future reference and analysis. In one embodiment, database/historian 212 is a PI System, commercially available from OSI Software, Inc. of San Leandro, Calif. A heat balance module 214 receives data from DAM 210 and database/historian 212 as requested to process algorithms that tunes a mass and energy balance model of the plant to match measured data as closely as possible. Discrepancies between the model and the measured data may indicate errors in the data. A performance module 216 uses plant equipment models to predict the expected performance of major plant equipment. A difference between expected and current performance may be degradation of each components condition, such as, but, not limited to fouling, scaling corrosion, and breakage. Performance module 216 tracks degradation over time so that performance problems that have the greatest effect on changes in plant power and heat rate can be identified. In the exemplary embodiment, process plant 110 is a desalination plant and performance module may model the desalination plant heat consumption using, for example, but not limited to a freshwater demand load level, a top brine temperature, a seawater injection temperature, and a top brine heater fouling.

An optimizer module 218 calculates a methodology of various operating components of plant 100 to optimize an economic dispatch of plant 100. At least some known dispatch methodologies dispatch a plant based on heat rate, making an assumption that heat rate is equivalent to monetary resources. In contrast, optimizer module 218 may solve an optimization wherein a component with a higher heat rate may be dispatched. For example, in certain situations, a demand for steam from header 136 may outpace a demand for electricity or the electrical output from portion 102 may be constrained by electrical system requirements. Dispatching a lower efficiency gas turbine engine 104 may allow greater heat to be recovered without raising electrical output in excess of a limit.

In the exemplary embodiment, optimizer module 218 is selectable between an online (automatic) and an offline (manual) mode. In the online mode, Optimizer 218 automatically computes current plant economic parameters such as cost of electricity generated, incremental cost at each level of generation, cost of process steam, and plant operating profit on a predetermined periodicity, for example, in real-time or once every five minutes. An offline mode may be used to simulate steady-state performance, analyze "what-if" scenarios, analyze budget and upgrade options, and predict current power generation capability, target heat rate, correction of current plant operation to guarantee conditions, impact of operational constraints and maintenance actions, and fuel consumption. Optimizer 218 calculates a profit optimized output for plant 100 based on real-time economic cost data, output prices, load levels, and equipment degradation, rather than an output based on efficiency by combining plant heat balances with a plant financial model. Optimizer 218 may be tuned to match the degradation of each component individually. Optimizer 218 may produce an advisory output 220 and/or may produce a closed feedback loop control output 222. Advisory output 220 recommends to operators where to set controllable parameters of plant 100 to optimize each component to facilitate maximizing profitability of plant 100. Additionally, optimizer 218 may calculate and transmit real-time costs to power marketing users (not shown). In the exemplary embodiment, advisory output 220 is a computer display screen communicatively coupled to a computer executing optimizer module 218. In an alternative embodiment, advisory output is a remote workstation display screen wherein the workstation accesses optimizer 218 data through a network (not shown). Additionally, advisory output 220 may be monitored to determine critical plant performance parameters.

Closed feedback loop control output 222 receives data from optimizer module 218 and calculates setpoint and/or bias settings for DCS 208 control modules to implement a real-time feedback control of plant equipment.

Figure 3:
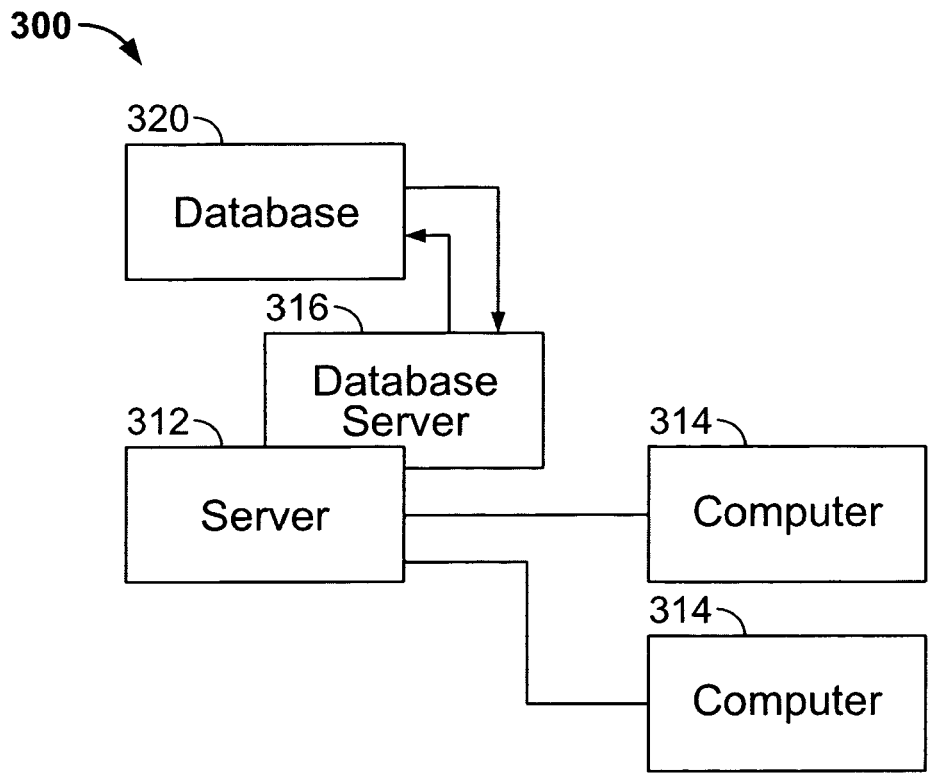
FIG. 3 is a simplified block diagram of a real-time thermal power and process plant optimization system that may be used to optimize the output of the thermal power and process plant shown in FIG. 1.

FIG. 3 is a simplified block diagram of a real-time thermal power and process plant optimization system 300 including a server system 312, and a plurality of client sub-systems, also referred to as client systems 314, communicatively coupled to server system 312. As used herein, real-time refers to outcomes occurring at a substantially short period after a change in the inputs affecting the outcome, for example, computational calculations. The period is the amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome. Additionally, events occurring in real-time, occur without substantial intentional delay. In the exemplary embodiment, calculations are updated in real-time with a periodicity of one minute. In one embodiment, client systems 314 are computers including a web browser, such that server system 312 is accessible to client systems 314 via the Internet. Client systems 314 are interconnected to the Internet through many interfaces including a network, such as a local area network (LAN) or a wide area network (WAN), dial-in-connections, cable modems and special high-speed ISDN lines. Client systems 314 could be any device capable of interconnecting to the Internet including a web-based phone, personal digital assistant (PDA), or other web-based connectable equipment. A database server 316 is connected to a database 320 containing information regarding a plurality of matters, as described below in greater detail. In one embodiment, centralized database 320 is stored on server system 312 and can be accessed by potential users at one of client systems 314 by logging onto server system 312 through one of client systems 314. In an alternative embodiment database 320 is stored remotely from server system 312 and may be non-centralized.

Figure 4:
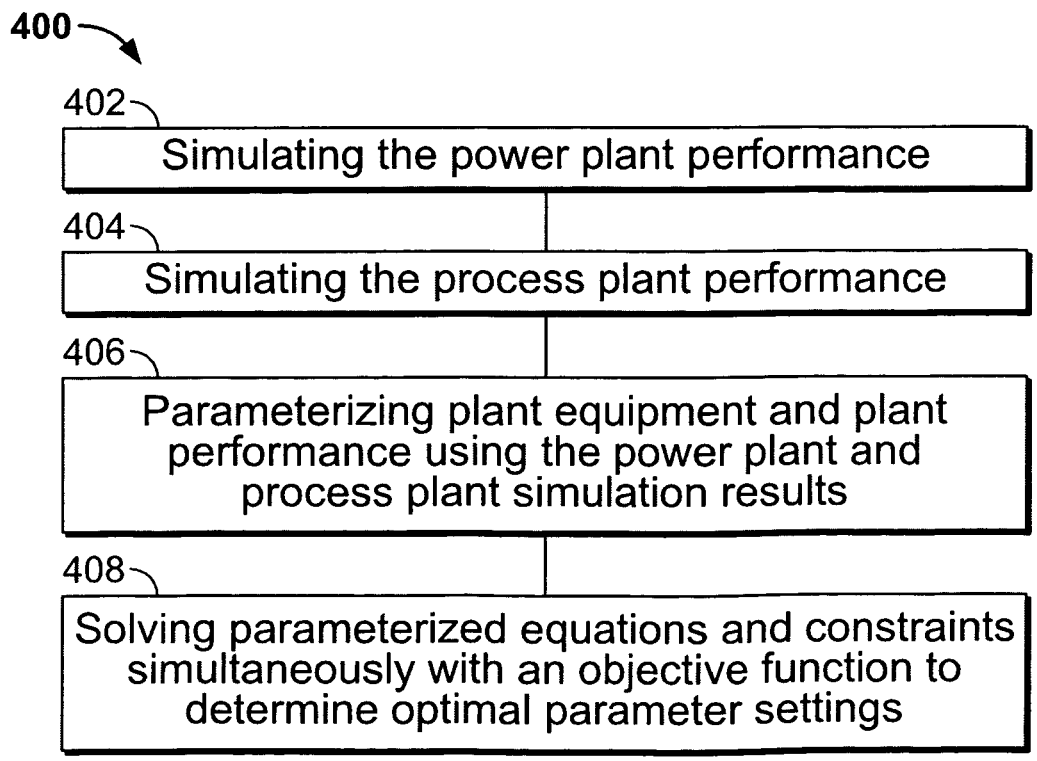
FIG. 4 is a flow chart of an exemplary method for operating the combined cycle/combined process plant shown in FIG. 1.

FIG. 4 is a flow chart of an exemplary method 400 for operating a combined cycle/combined process plant 100 (shown in FIG. 1). In the exemplary embodiment, process plant 100 includes at least one electrical generating power plant coupled in heat transfer communication to a steam-utilizing process plant. Method 400 includes simulating 402 the power plant performance using a plant performance module of a software code segment that receives power plant monitoring instrument data. The data may be received through a network from a plant distributed control system (DCS) or may be received from a database/historian software program executing on server or other computer accessible to the plant performance module. Additionally, the process plant performance is simulated 404 in a manner similar to that used to simulate 402 the power plant performance. Determining the performance of each plant in the same manner allows the overall plant to be treated as a single plant in order to determine optimal control settings for the overall plant rather than determining optimal settings for each plant separately. Measurable quantities for each major plant component are parameterized 406 to express overall plant efficiency on a component by component basis. Parameterizing plant equipment and plant performance includes calculating efficiency for components, such as, but not limited to, a gas turbine compressor, a gas turbine, a heat recovery steam generator (HRSG), a draft fan, a cooling tower, a condenser, a feed water heater, a brine heater, an evaporator, a flash tank, and a brine blow down. Similarly, heat-rate and performance calculations are parameterized 406 and the resulting simultaneous equations are solved 408 in real-time, such that calculational results are available without intentional delay from the time each parameter was sampled. Solving 408 parameterized simultaneous equations and constraints may also include determining a current heat balance for the overall plant, determining an expected performance using current constraints on operation of the plants, such as; but not limited to spinning reserve requirements, electrical system demand, maintenance activities, freshwater demand, and component outages. Solving 408 parameterized equations and constraints may also include determining parameters to adjust to modify the current heat balance such that a future heat balance equals the determined expected performance.

In an alternative embodiment, solving 408 parameterized simultaneous equations and constraints includes determining inlet conditions to the overall plant, predicting an output of the overall based on the determined inlet conditions and a predetermined model of the overall plant, determining a current output of the overall plant, comparing the predicted output to the determined output; and adjusting plant parameters until the determined output equals the predicted output.

In the exemplary embodiment, the process plant is a desalination plant of the multi-stage flash (MSF) design, in which seawater or saline water is heated at a temperature just under the boiling point of a pressure in a brine heater. A pressure inside an evaporator is lower than the pressure of the brine heater due to the effect of cooler saline water inside the evaporator tube bundle. When hot saline water enters the evaporator from the heater, the reduced pressure in the evaporator causes an immediate transformation of some of the liquid into steam, the water flashes into steam. This steam condenses and gives up its latent heat to incoming seawater. The seawater is heated further in the brine heater. Several stages of heaters and evaporators may be coupled together in fluid communication to define a multi-stage flash desalination plant. Simulating the performance of the desalination plant includes characterizing the process plant heat consumption as a function of at least one of a process plant load level, a top brine temperature, a seawater intake temperature, and a top brine heater fouling.

In the exemplary embodiment, method 400 also includes correlating controllable plant parameters plant equipment, and plant performance using parameterized equations, defining the objective of the optimization using an objective function that includes minimizing the heat rate of the overall plant or maximizing the profit of the overall plant, and defining the physically possible range of operation of each individual piece of equipment, and/or overall limits using constraints wherein the overall limits include maximum power production, maximum fuel consumption, and/or maximum water usage for condensation.

Figure 5:
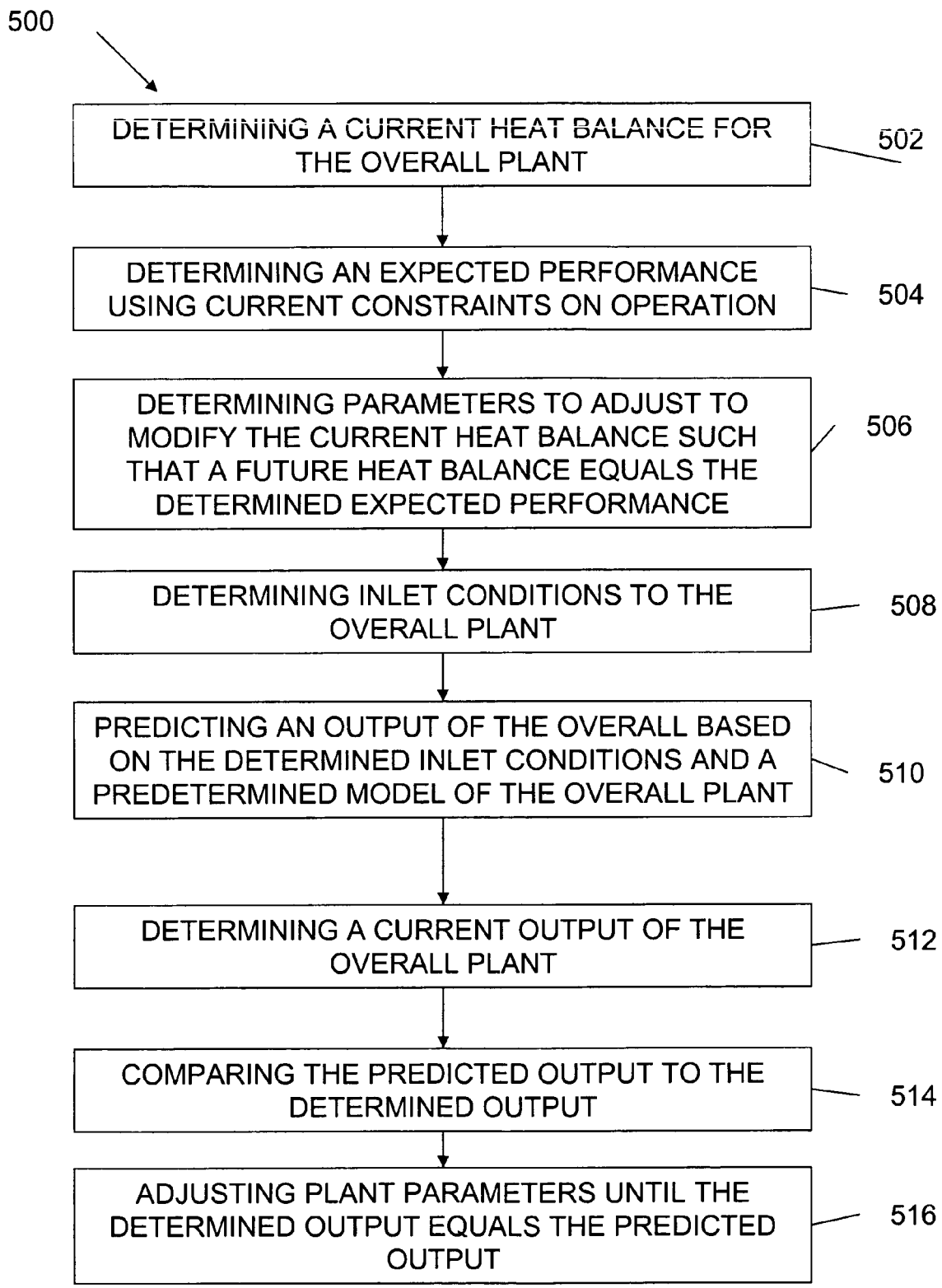
FIG. 5 is a flow chart of an exemplary method for solving parameterized simultaneous equations and constraints shown in FIG. 4.

FIG. 5 is a flow chart of an exemplary method 500 for solving parameterized simultaneous equations and constraints (shown in FIG. 4). Method 500 includes determining 502 a current heat balance for the overall plant, determining 504 an expected performance using current constraints on operation, and determining 506 parameters to adjust to modify the current heat balance such that a future heat balance equals the determined expected performance. Method 500 also includes determining 508 inlet conditions to the overall plant, predicting 510 an output of the overall based on the determined inlet conditions and a predetermined model of the overall plant, determining 512 a current output of the overall plant, comparing 514 the predicted output to the determined output, and adjusting 516 plant parameters until the determined output equals the predicted output.

The above-described methods and system provide a cost-effective and reliable means for optimizing combined cycle/combined process facilities. More specifically, the methods and apparatus facilitate an optimization system to recommend optimal control settings for a combined cycle power plant that includes a gas turbine electrical generator coupled to a desalination plant. As a result, the methods and apparatus described herein facilitate generating electrical power and producing fresh water from seawater in a cost-effective and reliable manner.

Exemplary embodiments of combined cycle/combined process facility optimization systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A computer-implemented method of operating a combined cycle electrical generating plant that facilitates optimizing the combined cycle electrical generating plant performance and that includes at least one electrical generating power plant coupled in heat transfer communication to a steam-utilizing process plant, said method comprising:
   simulating the power plant performance to determine power plant simulation results;
   simulating the process plant performance to determine process plant simulation results;
   parameterizing plant equipment and plant performance using the power plant and process plant simulation results;
   determining a current condition in the combined cycle electrical generating/steam-utilizing process plant;
   determining an expected performance for the combined cycle electrical generating/steam-utilizing process plant;
   solving parameterized simultaneous equations and constraints with an objective function to determine parameter settings that facilitate enhancing an efficiency of the combined cycle electrical generating/steam-utilizing process plant;
   outputting the determined parameter settings to a user via the computer;
   tracking power plant and process plant equipment degradation to facilitate identifying changes in plant power and heat rate; and
   recommending adjustments to the parameter settings based on identified changes in plant power and heat rate, wherein the adjustments facilitate modifying the current condition of the combined cycle electrical generating/steam-utilizing process plant to substantially equal the expected performance of the combined cycle electrical generating/steam-utilizing process plant.

2. A method in accordance with claim 1 wherein simulating the process plant performance comprises simulating a desalination plant performance.

3. A method in accordance with claim 1 wherein simulating the power plant performance comprises monitoring the power plant thermal performance.

4. A method in accordance with claim 3 wherein monitoring the power plant thermal performance comprises monitoring the power plant heat rate in real-time.

5. A method in accordance with claim 1 wherein simulating the process plant performance comprises characterizing the process plant heat consumption as a function of at least one of a process plant load level, a top brine temperature, a seawater intake temperature, and a top brine heater fouling.

6. A method in accordance with claim 1 wherein parameterizing plant equipment and plant performance comprises calculating efficiency for at least one of a gas turbine compressor, a gas turbine, a heat recovery steam generator (HRSG), a draft fan, a cooling tower, a condenser, a feed water heater, a brine heater, an evaporator, a flash tank, and a brine blow down.

7. A method in accordance with claim 1 wherein
   determining a current condition in the combined cycle electrical generating/steam-utilizing process plant further comprises determining a current heat balance for the combined cycle electrical generating/steam-utilizing process plant;

determining an expected performance for the combined cycle electrical generating/steam-utilizing process plant further comprises determining an expected performance using current constraints on operation; and modifying the current condition of the combined cycle electrical generating/steam-utilizing process plant to substantially equal the expected performance of the combined cycle electrical generating/steam-utilizing process plant further comprises modifying the current heat balance such that a future heat balance equals the determined expected performance.

8. A method in accordance with claim 1 wherein determining a current condition in the combined cycle electrical generating/steam-utilizing process plant further comprises determining inlet conditions to the combined cycle electrical generating/steam-utilizing process plant and determining a current output of the combined cycle electrical generating/steam-utilizing process plant;

determining an expected performance for the combined cycle electrical generating/steam-utilizing process plant further comprises predicting an output of the combined cycle electrical generating/steam-utilizing process plant based on the determined inlet conditions and a predetermined model of the combined cycle electrical generating/steam-utilizing process plant;

comparing the predicted output to the determined output; and modifying the current condition of the combined cycle electrical generating/steam-utilizing process plant to substantially equal the expected performance of the combined cycle electrical generating/steam-utilizing process plant further comprises modifying plant parameters until the determined output equals the predicted output.

9. A method in accordance with claim 1 further comprising correlating controllable plant parameters, plant equipment, and plant performance using parameterized equations.

10. A method in accordance with claim 1 further comprising defining an objective of optimizing the combined cycle electrical generating plant by using an objective function that includes at least one of minimizing the heat rate and maximizing the profit.

11. A method in accordance with claim 1 further comprising:

defining at least one of the physically possible range of operation of each individual piece of equipment; and defining overall limits using constraints.

12. A method in accordance with claim 11 wherein defining overall limits comprises defining at least one of maximum power production, maximum fuel consumption, and maximum water usage for condensation.

13. A computer readable medium for optimizing overall plant performance in a combined cycle electrical generating/steam-utilizing process plant, the computer readable medium encoded with a program configured to instruct a computer to:

simulate an electrical power plant performance to determine electrical power plant simulation results;

simulate a performance of a steam-utilizing process plant coupled in heat-transfer communication with the electrical power plant to determine steam-utilizing process plant simulation results;

parameterize overall plant equipment and overall plant performance using the electrical power plant and steam-utilizing process plant simulation results;

determine a current condition in the combined cycle electrical generating/steam-utilizing process plant;

determine an expected performance for the combined cycle electrical generating/steam-utilizing process plant;

solve parameterized simultaneous equations and constraints with an objective function to determine parameter settings that facilitate enhancing an efficiency of the combined cycle electrical generating/steam-utilizing process plant;

output the determined parameter settings to a user;

track power plant and process plant equipment degradation to facilitate identifying changes in plant power and heat rate; and recommend adjustments to the parameter settings based on identified changes in plant power and heat rate, wherein the adjustments facilitate modifying the current condition of the combined cycle electrical generating/steam-utilizing process plant to substantially equal the expected performance of the combined cycle electrical generating/steam-utilizing process plant.

14. A computer readable medium in accordance with claim 13 encoded with a program configured to instruct a computer to simulate a desalination plant performance.

15. A computer readable medium in accordance with claim 13 encoded with a program configured to instruct a computer to monitor the power plant thermal performance.

16. A computer readable medium in accordance with claim 15 encoded with a program configured to instruct a computer to monitor a power plant heat rate in real-time.

17. A computer readable medium in accordance with claim 13 encoded with a program configured to instruct a computer to characterize the process plant heat consumption as a function of at least one of a process plant load level, a top brine temperature, a seawater intake temperature, and a top brine heater fouling.

18. A computer readable medium in accordance with claim 13 encoded with a program configured to instruct a computer to calculate efficiency for at least one of a gas turbine compressor, a gas turbine, a heat recovery steam generator (HRSG), a draft fan, a cooling tower, a condenser, a feed water heater, a brine heater, an evaporator, a flash tank, and a brine blow down.

19. A computer readable medium in accordance with claim 13 encoded with a program configured to instruct a computer to:

determine a current heat balance for the combined cycle electrical generating/steam-utilizing process plant;

determine an expected performance using current constraints on operation; and determine parameters to adjust to modify the current heat balance such that a future heat balance equals the determined expected performance.

20. A computer readable medium in accordance with claim 13 encoded with a program configured to instruct a computer to:

determine inlet conditions to the combined cycle electrical generating/steam-utilizing process plant;

predict an output of the overall plant based on the determined inlet conditions and a predetermined model of the overall plant;

determine a current output of the overall plant;

compare the predicted output to the determined output; and recommend adjustments to plant parameters until the determined output equals the predicted output.

21. A computer readable medium in accordance with claim 13 encoded with a program configured to instruct a computer to correlate controllable plant parameters, plant equipment, and plant performance using parameterized equations.

22. A computer readable medium in accordance with claim 13 encoded with a program configured to instruct a computer to define an objective of optimizing overall plant performance using an objective function that includes at least one of minimizing the heat rate and maximizing the profit.

23. A computer readable medium in accordance with claim 13 encoded with a program configured to instruct a computer to:
define at least one of the physically possible ranges of operation of each individual piece of equipment; and
define overall limits using constraints.

24. A computer readable medium in accordance with claim 23 encoded with a program configured to instruct a computer to define at least one of maximum power production, maximum fuel consumption, and maximum water usage for condensation.

25. A computer readable medium in accordance with claim 13 encoded with a program comprising:
a data acquisition module (DAM) communicatively coupled to a process plant control system;
a plant thermal performance monitor module for calculating a current plant heat-rate communicatively coupled to said DAM; and
an optimizer module for solving simultaneous parametric equations with process plant constraints communicatively coupled to said plant thermal performance monitor module.

26. A computer readable medium in accordance with claim 25 further comprising at least one of a database/historian, a heat balance module, an advisor module, and a closed-loop feedback control module.

27. A combined cycle/combined process plant optimizing system for a combined cycle electrical generating/steam-utilizing process plant comprising:
a first process plant that generates a quantity of waste heat;
a second process plant that utilizes heat as an input to at least one plant process, said second plant in heat-transfer communication with said first process plant; and
a computer operationally coupled to at least one of said first process plant and said second process plant, said computer configured to:
monitor process parameters of said first process plant and said second process plant;
simulate said first process plant performance to determine first process plant simulation results;
simulate said second process plant performance to determine second process plant simulation results;
parameterize a plurality of overall plant equipment and overall plant performance using the first and second process plant simulation results;
determine a current condition in said combined cycle electrical generating/steam-utilizing process plant;
determine an expected performance for said combined cycle electrical generating/steam-utilizing process plant;
solve parameterized simultaneous equations and constraints with an objective function to determine parameter settings that facilitate enhancing an efficiency of the combined cycle electrical generating/steam-utilizing process plant;
output the determined parameter settings to a user;
track process plant equipment degradation to facilitate identifying changes in plant power and heat rate; and
recommend adjustments to the parameter settings based on identified changes in plant power and heat rate, wherein the adjustments facilitate modifying the current condition of said combined cycle electrical generating/steam-utilizing process plant to substantially equal the expected performance of said combined cycle electrical generating/steam-utilizing process plant.

28. An optimizing system in accordance with claim 27 wherein said first process plant is an electrical generating power plant and said second process plant is a desalination plant.

29. An optimizing system in accordance with claim 27 wherein said process parameters include at least one of a top brine temperature, a re-circulation ratio, a frequency and duration of blow downs, a component inlet and outlet temperatures, a component fluid flow, and a component pressure.

* * * * *